Nov. 9, 1971  E. H. THOMPSON  3,618,217
SCALE VARIATION CONTROLLING MECHANISMS
Filed Feb. 20, 1970  3 Sheets-Sheet 3

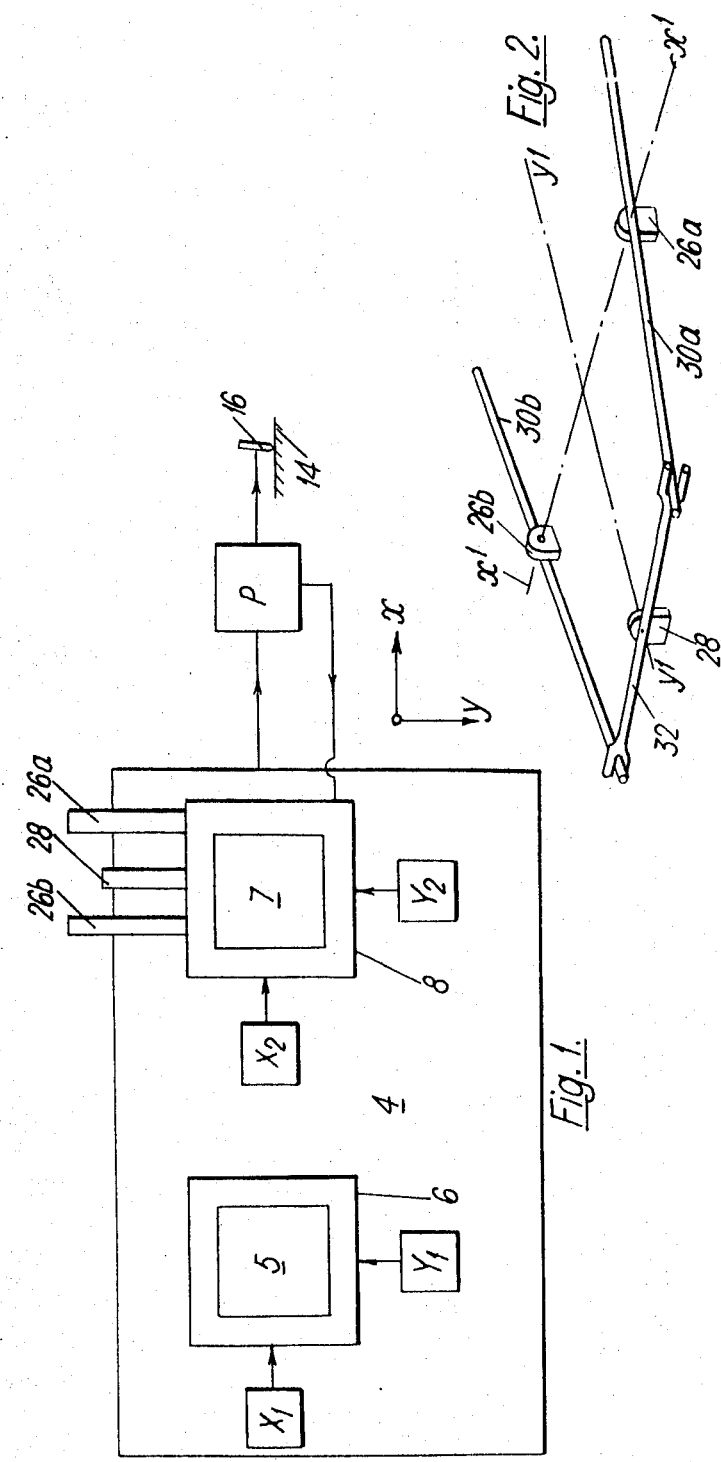

Inventor
EDGAR HYNES THOMPSON
By
Cushman, Darby & Cushman
Attorneys

United States Patent Office 3,618,217
Patented Nov. 9, 1971

3,618,217
SCALE VARIATION CONTROLLING MECHANISMS
Edgar Hynes Thompson, 79 Park Road,
London, W. 4, England
Filed Feb. 20, 1970, Ser. No. 13,017
Claims priority, application Great Britain, Feb. 28, 1969,
10,907/69
Int. Cl. B43l $13/00$; G01c $11/00$
U.S. Cl. 33—20 D
10 Claims

ABSTRACT OF THE DISCLOSURE

A scale variation controlling mechanism for a photogrammetric plotter for use in interpreting aerial photographs. The mechanism comprises a plotting table, a holder for a drawing member which is to draw a plan on the plotting table, first and second relatively movable tables mounted on a common carriage and which support two photographs showing a region of overlap, means connecting the relatively movable tables to the holder, a stereoscopic viewing system for viewing the region of overlap on the photographs, means for relatively adjusting the viewing system and each of the relatively movable tables independently so as to provide at least a part of a correction of any tilt of each photograph with respect to the horizontal and of any difference in the height of the two stations from which the photographs were taken.

---

Figure 3:
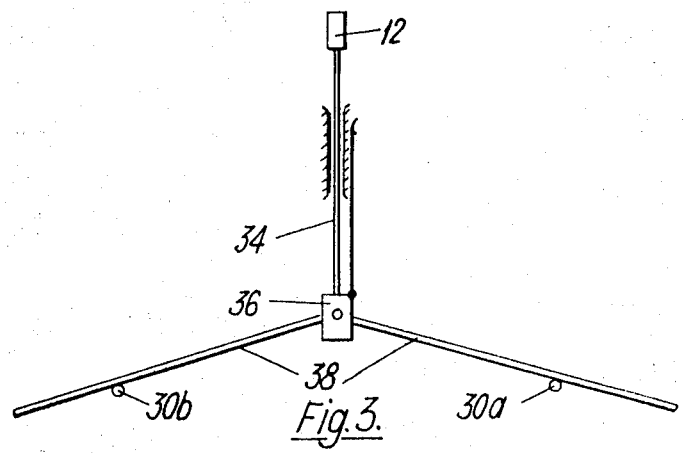

This invention relates to scale variation controlling mechanisms for photogrammetric plotters.

In photogrammetric plotting a pair of photographs showing a region of overlap are stereoscopically associated to produce a map of their region of overlap.

Such overlapping photographs are commonly produced by aerial survey: inevitably the photographs will be tilted with respect to the horizontal and there will be differences in height between the two photographing stations which must be corrected when the photographs are employed in pairs to plot a map of the area. While photogrammetric plotters are known in which mechanisms are provided for the full and exact correction of such errors, they are complex and expensive to produce. Other instruments have been produced of a simpler construction which are able to apply only approximate corrections and are considerably cheaper although they are less accurate, of course, and are therefore more suitable for smaller scale mapping.

The present invention is concerned with scale variation controlling mechanisms for so-called third order plotters, that is to say plotters which afford only approximate corrections to the displacements from the ideal at the photographing stations.

As a basis for approximate correction in the present invention it is assumed that all angular displacements of the camera producing the photographs are small so that we can assume that the value of the sine of any tilt angle is equal to the angle itself and the value of its cosine is unity.

If two mutually perpendicular horizontal directions $x$, $y$ are taken, the $x$ axis being in a vertical plane through the stations at which the two photographs are taken, and the co-ordinates of co-incident points on respective ones of the two photographs are termed $x_1$, $y_1$ and $x_2$, $y_2$, it is found that using the angular approximation referred to above, it is possible to define the required corrections $\Delta$ to these co-ordinates in the following manner:

$$\Delta x_1 = a_1 + b_1 x_1^2 + c_1 y_1 + d_1 x_1 y_1$$
$$\Delta x_2 = a_2 + b_2 x_2^2 + c_2 y_2 + d_2 x_2 y_2$$
$$\Delta y_1 = a_1' + b_1' y_1^2 + c_1' y_1 + d_1' x_1 y_1$$
$$\Delta y_2 = a_2' + b_2' y_2^2 + c_2' y_2 + d_2' x_2 y_2$$

According to the present invention, there is provided a scale variation controlling mechanism for a photogrammetric plotter which comprises a plotting table, a holder for holding a drawing member which is to draw a plan on the plotting table, first and second relatively movable tables which are mounted on carriage means and which are respectively adapted to support two photographs showing a region of overlap, means connecting at least one of said relatively movable tables to the said holder, a viewing system through which the said region shown on both photographs may be viewed stereoscopically, means for effecting a relative adjustment between the viewing system and each of the first and second relatively movable tables independently so as to provide at least a part of the hereinbefore defined correction of any tilt of each photograph with respect to the horizontal and of any difference in the height of the two stations from which the photographs were taken, an adjustable magnification producing means connecting the said drawing member to one of the relatively movable tables and movement transmitting means connected to the said one relatively movable table so as to vary the separation of the said relatively movable tables as the magnification is varied.

The word "magnification" is used in the absolute sense and should be understood to include in its meaning "negative magnification."

In a preferred embodiment, said adjustable magnification producing means includes a pantograph system having an arm carrying the said drawing member and connected through a gimbal means to the said carriage means, the said gimbal means being displaceable perpendicularly to the said plotting table and to the said carriage means.

Preferably said movement transmitting means includes a link means pivotally connected to one of said relatively movable tables and to said common carriage, a tape being also connected between said link means and the said gimbal means.

The pivotal connection between the said one movable table and the link means preferably includes a block which is slidable on a rod fixed to said one table and which carries a roller in contact with the link means.

The invention also includes a photogrammetric plotter having a scale variation controlling mechanism as set forth above.

The said plotter preferably includes a stereoscope arrangement which is completely symmetrical for both photographs.

The said plotter preferably includes a height measuring device.

The said arrangement may include at least one respective rotatable mirror arranged to receive light from a said photograph, the rotations being controlled by two lever systems associated with the appropriate tilt correction means, and it may include a respective translatable illuminated mark, the translation being controlled by a lever system associated with the appropriate tilt correction means.

Figure 4:
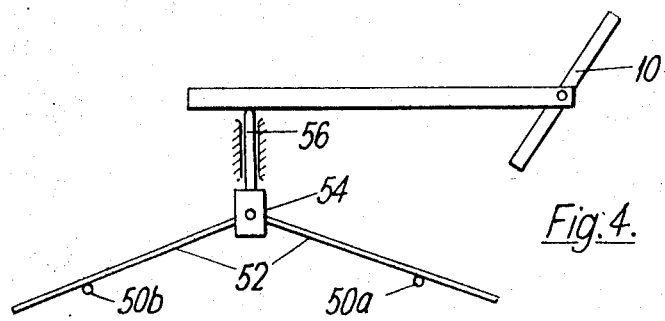
Figure 6:
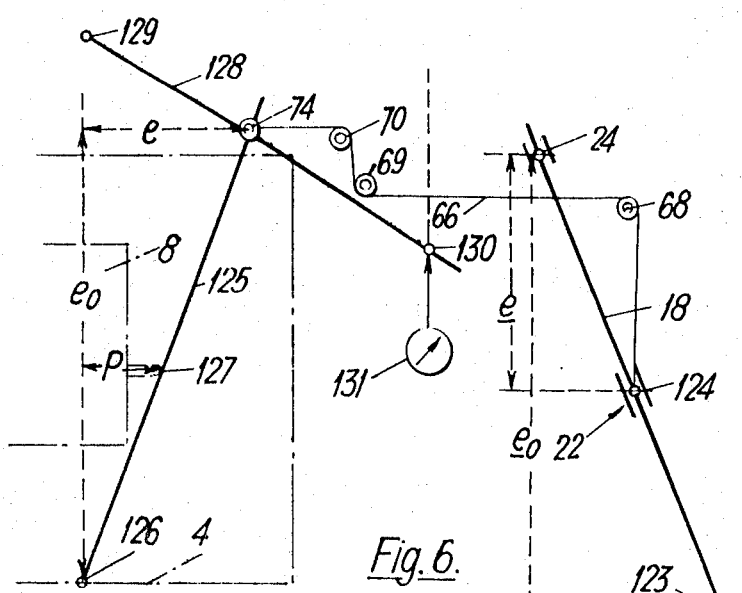
Figure 5:
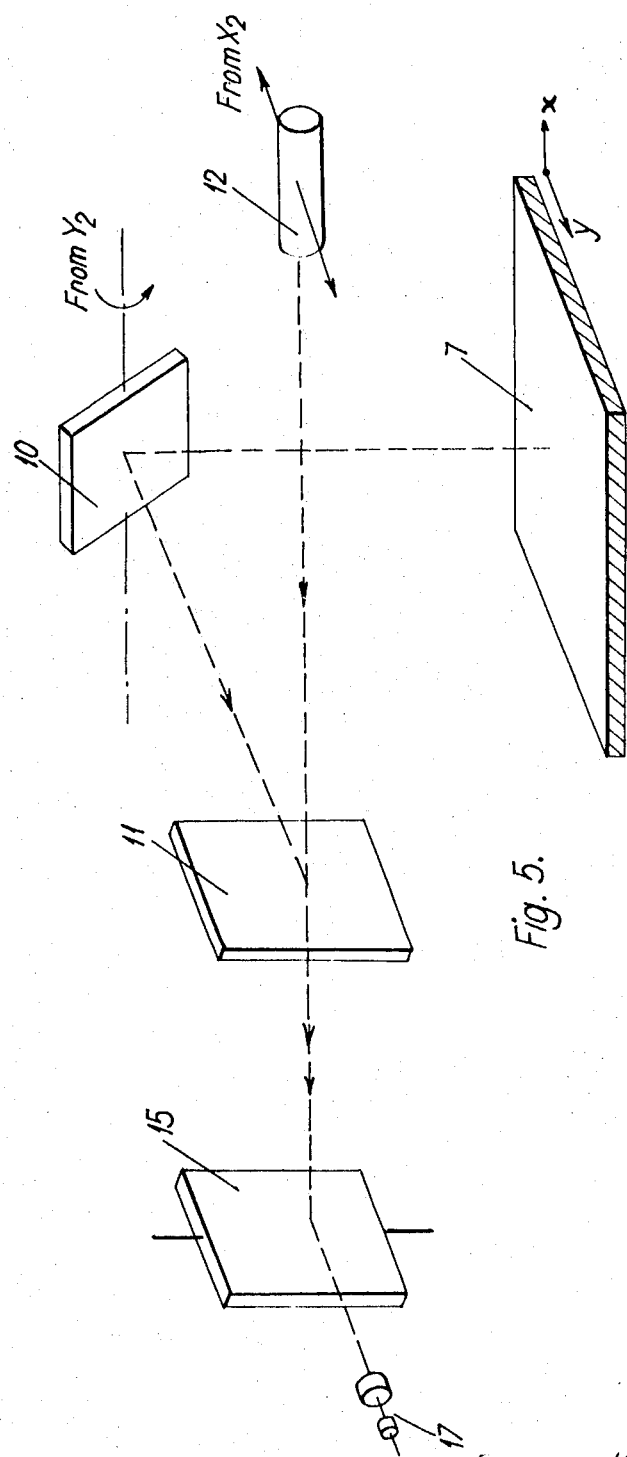

The invention will now be more particularly described, merely by way of example, with reference to the accompanying drawings, wherein:

FIG. 1 is a schematic plan view of one form of photogrammetric plotter having a height variation controlling mechanism according to the present invention, FIG. 2 shows a detail of one of the $x$ corrector mechanisms of the plotter of FIG. 1 in perspective, FIG. 3 is a schematic front elevation of said corrector mechanism showing its input connection to the plotter viewing system, FIG. 4 is an illustration similar to FIG. 3 of one of the $y$-corrector mechanisms, FIG. 5 is a schematic perspective view of one-half of the symmetrical stereoscopic arrangement embodied in the plotter of FIG. 1, with certain obvious optical elements not essential to the understanding of the invention being omitted for the sake of clarity, and FIG. 6 is a schematic view of the height variation controlling mechanism of the invention, the left-hand side (as viewed) being in plan, the right-hand side being in elevation.

Referring first to FIGS. 1 and 5 of the drawings, the plotter comprises a fixed base on which a planar carriage 4 can slide horizontally, mounting tables 6, 8 for respective ones of a pair of photographs 5, 7 being independently slidable in turn on the surface of the carriage 4. The relative movement between the tables 6, 8 and respective illuminated marks (referred to below) is controlled by correctors $X_1$, $X_2$, in $x$ and $Y_1$, $Y_2$ in $y$. The photographs can be rotatably adjusted in the plane of their tables 6, 8.

A stereoscopic viewing arrangement (FIG. 5) comprises, for each photograph, a primary mirror 10 rotatable about an axis parallel to $x$ and set substantially at 45° to the horizontal; a semi-reflecting secondary mirror 11 which may be fixed or may be rotatable about a substantially vertical axis, a further mirror 15, and an eyepiece 17. Through the eyepieces 17 the photographs can be viewed stereoscopically, the movement of the carriage permitting different regions to be viewed and the displacement of the tables 6, 8 allowing stereoscopic fusion of the images projected from the photographs by the viewing arrangement. Laterally beyond each mirror 10 are respective illuminated marks 12 light from which can be projected through the secondary mirrors 11 and the images of the two marks can then be viewed as a single fused mark representing a point in space in the observed stereoscopic image of the photographs.

Thus light from the photograph 7 will strike the mirror 10 from which it is reflected parallel to $y$ to be reflected by the mirrors 11 and then 15 to the eyepiece 17. The mark 12 will be seen superimposed on the virtual image of the photograph 5. The mark 12 may be displaceable in a direction parallel to $y$ and is controlled by means not shown from the corrector $X_2$, or, where the mirror 11 is rotatable, the mark 12 may be fixed, in which case the rotation of the mirror is controlled by means not shown from the corrector $X_2$. The rotation of the mirror 10 through small angles is controlled by a lever system (not shown) connected to the corrector $Y_2$ described below.

If so desired, the mirror 15 may be rotatable about a vertical axis so as to keep the image of the mark in the middle of the eyepiece field. This rotation may be linked to the mark or it may be under an operator's control.

When the mark appears to touch the ground, the sources of the images of the respective marks 12 are on corresponding virtual images of their photographs.

A plotting table 14 by the side of the base has bearing on it a recording pencil 16 carried by a variable enlarger P having a pantograph arm 18 (FIG. 6) and a rigid link (not shown) from the carriage 4 is attached to a sleeve 124 forming part of a gimbal 22 attached to the arm 18. The arm 18 is pivotally connected at 123 to the pencil 16 to displace the pencil across the plotting table 14 with the movement of the carriage 4, the upper end of the arm being held fixed against displacement by a second gimbal 24. Thus, movement of the carriage 4 so that a floating mark is kept touching some characteristic of the stereoscopic photographic model will cause the pencil 16 to trace that characteristic to a predetermined scale provided the photographs are untilted and there are no height variations in the region being examined. From the variable enlarger P there is a feedback, described in more detail below, to one of the photographs to displace the latter in the $x$-direction. The feedback is so arranged that the magnification produced by the variable enlarger P is automatically set at precisely the value required by the parallax of the point at which the floating mark is on the ground.

In order to correct the tilts of the photographs, the $x$ and $y$ corrections referred to above are employed through the action of a number of similar mechanisms which each produce a displacement of a photograph relative to the mark. It will be appreciated that these forms of relative movement are in principle interchangeable and the particular mechanism displacements to be described below are simply those which have been found to be the most convenient to employ.

To describe first the $x$ correctors, identical mechanisms $X_1$, $X_2$ are provided at both sides of the instrument and are mounted on the main carriage 4. As shown in FIG. 2, each mechanism comprises three brackets 26a, 26b and 28 fixed relative to the respective tables 6, 8. To each of these brackets respective rods 30a, 30b, 32 are pivoted at their mid-points. The pivots of the brackets 26a, 26b are coaxial and parallel to the $x$ axis of the carriage 4 while the pivot of the bracket 28 has its axis parallel to the $y$ axis of the carriage 4. The rod 32 on the bracket 28 has forked ends which embrace ends of the rods 30a, 30b so that a rotation of the rod 32 on its bracket pivot rotates the rods 30a, 30b equally and oppositely about their pivots.

If the pivot axis of the brackets 26a, 26b represents the axis $x'$ and that of the bracket 28 the axis $y'$ the result of a deflection of the rods 30a, 30b is that the surface defined by a series of straight lines drawn perpendicular to the $y'$ axis and joining the rods 30a, 30b has at any point an ordinate, perpendicular to the $x'y'$ plane, proportional to its co-ordinate product $x'y'$. Since the axes $x'$, $y'$ are parallel to the axes $x$, $y$ of the carriage 4, this vertical ordinate also varies directly with its co-ordinate product $xy$.

A follower of the mechanism that traces the surface generated by the rods 30a, 30b and also adds a further correction is shown in FIG. 3. The follower comprises a guide 34 mounted to the main frame so as to be vertically slidable thereon and having at its lower end a block 36 to which a pair of follower rods 38 are freely pivoted to tilt as a unit, the rods 38 resting on the rods 30a, 30b. The angle formed between the rods 38 is adjustable and if they are made coaxial the pivot centre at the block 36 will trace directly the surface generated by the opposed inclinations of the rods 30a, 30b. Applying a mutual obliquity to the follower rods 38 generates a further vertical displacement component since, as the rods 30a, 30b move with the table 6 in the $x'$ direction the block 36 traces, relative to the $y'$ axis a curved path approximating to a parabola. For a true parabola, the associated vertical displacement of the block 36 is proportional to $x^2$ and while the actual curve traced is circular and is thus not a true parabola, within the range of angular settings required for the rods 38 the quantitative values achieved in vertical displacements of the pivot centre of the rods given an extremely close approximation to the desired relationship.

As the follower bars 38 are moved relative to the frame bars 30a, 30b, therefore the guide 34 and block 36 have a vertical position dependent upon the sum of quantities proportional to $xy$ and $x^2$. In the right hand side of the instrument this is fed into the stereoscopic viewing arrangement by displacing the mark 12 (or the mirror 11) in the y-direction thereby altering the parallax effect of the fused image of the two marks 12.

The invention preferably provides a further corrector mechanism for each photograph to generate the $xy$ and $y^2$ terms for the $\Delta y$ corrections in accordance with the equations given above.

FIG. 1 indicates correctors $Y_1$, $Y_2$ of the instrument for the $y$ corrections and FIG. 4 shows one of these mechanisms which generates the required corrective displacements by the same means as the correctors $X_1$, $X_2$. In this mechanism, frame rods 50a, 50b, equivalent to the rods 30a, 30b of an $x$ corrector and pivotally mounted to the carriage 4 in a similar manner are now directed parallel to the $x$ axis of the carriage and a further rod (not shown) links their ends in the same way as the rod 32 links the rods 30a, 30b. Follower rods 52 are pivoted to a follower block 54 and a vertical guide rod 56 secured to the block rotates the mirror 10 by a lever mechanism shown in FIG. 4.

Analogously to the $x$-correctors the displacement of the guide rod 56 can be transferred to a displacement of the mark 12 (or the mirror 11) in a direction perpendicular to the carriage 4.

While the above-described corrective mechanisms compensate for tilts in the photographs, further correction is required if the areas represented by the photographs have varying heights since any given ground distance will be indicated by a varying measurement on a photograph, depending upon the height of the ground, due to the variation of photographic scale with height. The plotter apparatus therefore has means for varying the relation between displacements of the carriage 4 and of the pencil 16 in dependence upon changes in the observed parallax between the photographs due to height variations.

Referring to FIG. 6, it will be noted that the magnification produced by the pantograph arm 18 is controlled by the distances of the gimbals 22, 24 respectively from the level of the plotting table 14. In the present construction, the height of the gimbal 24 is kept constant, and the height of the gimbal 22 is arranged to be varied continuously during a plot to correct for height variation at different overlapping points on the photographs.

In order to be able to deal with variations in the height in an area under survey, that is to say, to compensate the plot of a map or chart being prepared from the photographs for the distortion of the photographic representation of the area due to the different heights of points in the area, it is required to select the scale at which a contour of the map is traced in accordance with the relative height of the contour.

In order to accomplish this, reference should be made to FIG. 6 which shows the sleeve 124 of the gimbal 22 attached to a cable or tape 66 that passes round pulleys 68, 69, 70 to a wheel (not shown, but preferably mounted on the carriage 4) for adjustment by the plotter operator, preferably by means of a foot wheel. The tape 66 has a pivot 74 connected to it, the pivot 74 being in contact with one end of a substantially horizontal link 125 the other end 126 of which is pivotally connected to the carriage 4. Intermediate to the pivots 74, 126 the link 125 has a connection 127 with the right-hand photograph 7, or rather the right-hand movable table 8. The connection 127 preferably comprises an arrangement (not shown) having a roller connected to the link 125 and carried on a block which can slide in the y-direction on a rod fixed to the table 8. The pivot 74 is constrained to move along a line parallel to $x$.

The magnification of the enlarger is the ratio of the perpendicular distances of the gimbal 24 from the plotting table 14, $e_0$, and the gimbal 24 from the gimbal 22, $e$, and as always greater than one. The geometry of the link 125 and its pivotal connections is such that if the distance of 74 from a line parallel to $y$ through 126 is adjusted to be $e_0$, the perpendicular distance parallel to $x$ between the said line and the connection 127 is equal to the parallax of any sighted point when 127 has been correctly adjusted in the direction $y$.

A link 128 rotatably pivoted at 129 on the line through 126 parallel to $y$ is in contact with the pivot 74. A pivot 130 is in contact with the link 128 and is constrained to move parallel to $y$. The movement of 130 is recorded by a clock gauge 131 or suitable scale. The geometry is such that the difference of two readings of the gauge 131 when two points are sighted on the pictures in proportional to the difference in height of the two points on the ground.

To keep the pencil 16 in contact with the table, the pantograph arm 18 may be arranged to be freely slidable in cylindrical sleeves that form the innermost elements of the gimbals 22, 24.

A further difficulty may be encountered at the pantograph arm 18 due to its inherent tendency to slide under gravity to an increasing inclination. This can make it difficult to move the arm in the opposite direction and so cause loss of sensitivity when tracing the plot. To counteract this, either gimbal may carry below it and fastened to its inner element a counterweight to impose a restoring moment at the gimbals acting oppositely to the displacing gravitational force on the arm 18. It will be noted that this restoring force increases and decreases with the inclination of the arm in the same way as does the displacing force so that a balance between the two forces is maintained regardless of the position of the pencil on the table 14.

I claim:

1. A scale variation controlling mechanism for a photogrammetric plotter which comprises a plotting table, a holder for holding a drawing member which is to draw a plan on the plotting table, first and second relatively movable tables which are respectively adapted to support two photographs showing a region of overlap, carriage means to carry the said relatively movable tables, means connecting at least one of said relatively movable tables to the said holder, a viewing system through which the said region shown on both photographs may be viewed stereoscopically, means for effecting a relative adjustment between the viewing system and each of the first and second relatively movable tables independently so as to provide at least a part of the hereinbefore defined correction of any tilt of each photograph with respect to the horizontal and of any difference in the height of the two stations from which the photographs were taken, an adjustable magnification producing means connecting in use the said drawing member to one of the relatively movable tables, and movement transmitting means connected to the said one relatively movable table so as to vary the separation of the said relatively movable tables as the magnification is varied.

2. A mechanism as claimed in claim 1 wherein said adjustable magnification producing means includes a pantograph system having an arm to carry the said drawing member, gimbal means connected between said arm and the said carriage means, the said gimbal means being displaceable perpendicularly to the said plotting table and to the said carriage means.

3. A mechanism as claimed in claim 2 wherein there is a common carriage, constituting the said carriage means for the said relatively movable tables, said arm being connected to said common carriage through said gimbal means.

4. A mechanism as claimed in claim 2 wherein said movement transmitting means includes a link means pivotally connected to one of said relatively movable tables and to said carriage means, a tape being also connected between said link means and the said gimbal means.

5. A mechanism as claimed in claim 4 wherein there is a block, a rod on which said block is slidably mounted and which is fixed to said one table, and a roller in contact with the link means and carried by said block, said block, rod and roller constituting the pivotal connection between the said one movable table and the link means.

6. A photogrammetric plotter having a scale variation controlling mechanism as claimed in claim 1.

7. A plotter as claimed in claim 6 further including a stereoscope arrangement which is completely symmetrical for both photographs.

8. A plotter as claimed in claim 6 further including a height measuring device.

9. A plotter as claimed in claim 7 wherein the said arrangement includes at least one respective rotatable mirror arranged to receive light from a said photograph, an illuminated mark and two lever systems associated with the appropriate tilt correction means to control the rotations.

10. A plotter as claimed in claim 9 wherein the illuminated mark is translatable, there being a lever system associated with the appropriate tilt correction means for controlling the translation of the said mark.

References Cited
UNITED STATES PATENTS

| | | | |
|---|---|---|---|
| 3,170,238 | 2/1965 | Yzerman | 33—20 D |
| 3,182,398 | 5/1965 | Santoni | 33—20 D |

HARRY N. HAROIAN, Primary Examiner